United States Patent [19]

Käbisch et al.

[11] 3,742,061

[45] June 26, 1973

[54] PROCESS FOR THE EXTRACTION OF HYDROGEN PEROXIDE FROM WORKING SOLUTIONS OF THE ALKYLANTHRAQUINONE PROCESS

[75] Inventors: Gerhard Käbisch, Rheinfelden; Siegfried Raupach, Beuggen, both of Germany

[73] Assignee: Deutsche-Gold- und Silber-Scheideanstalt vormals Roessler, Frankfurt am Main, Germany

[22] Filed: Sept. 2, 1970

[21] Appl. No.: 69,153

[30] Foreign Application Priority Data

Sept. 10, 1969 Germany.................. P 19 45 752.4

[52] U.S. Cl................... 423/588, 252/349, 423/589
[51] Int. Cl........................ C01b 15/02, B01d 11/00
[58] Field of Search...................... 23/207; 260/369; 252/349; 423/588, 589

[56] References Cited

UNITED STATES PATENTS

| | | | |
|---|---|---|---|
| 2,886,416 | 5/1959 | Cox et al. | 23/207 |
| 2,430,796 | 11/1947 | Wiczer | 252/349 |
| 3,499,737 | 3/1970 | Durrell et al. | 23/359 |
| 3,328,128 | 6/1967 | Käbisch | 260/369 |

Primary Examiner—Oscar R. Vertiz
Assistant Examiner—Hoke S. Miller
Attorney—Cushman, Darby & Cushman

[57] ABSTRACT

Hydrogen peroxide is extracted from the working solution of the alkyl anthraquinone process by solvents which are lighter than water and which produce the dispersed phase in the extraction step. The extraction is carried out in unfilled towers which at the bottom are fitted with known elements for dispersing organic liquids, e.g. perforated plates.

11 Claims, No Drawings

PROCESS FOR THE EXTRACTION OF HYDROGEN PEROXIDE FROM WORKING SOLUTIONS OF THE ALKYLANTHRAQUINONE PROCESS

The present invention is concerned with a process for the extraction of hydrogen peroxide from working solutions according to the anthraquinone process.

It is known according to the anthraquinone process to dissolve an alkyl anthraquinone or a partially nuclear hydrogenated anthraquinone, the reaction carrier, in a solvent and then to hydrogenate the thus obtained working solution in the presence of a catalyst to such an extent that about 50 percent of the quinone is converted into the corresponding hydroquinone. In the oxidation step the hydroquinone solution is treated with an oxygen containing gas as a result of which the quinone is reformed while at the same hydrogen peroxide is formed and is washed out of the organic phase with water. By returning the working solution to the hydrogenation step and repeating in turn the named individual procedures, there is developed cyclic process by which hydrogen peroxide is synthesized in practical manner from the gases hydrogen and oxygen (from the air) by means of the reaction carriers dissolved in the working solution. The hydrogen peroxide is normally extracted from the working solution with water. In carrying out this extraction, it is important that the hydrogen peroxide formed not only be washed out of the working solution as quantitatively as possible, but care must also be taken that the hydrogen peroxide be obtained in the highest degree of purity possible and in a high concentration which permits a direct use or further processing of the product.

Numerous apparatuses for the industrial carrying out of the extraction have been proposed in the past. These are classified in three groups.

1. Mixer - settlers
2. Extraction machines
3. Extraction columns

The apparatus of group 1 have not been succesfully used industrially since they require too great an apparatus expense and the necessary liquid holdup using this apparatus is too great.

The apparatus of group 2 to which belong particularly extraction machines of the Podbielniak type have less fluid holdup and the residence time of both phases -organic phase (working solution) and aqueous hydrogen peroxide phase - in the extraction step are short. However, these machines demand a high investment requirement and as a fast operating continuous apparatus require a large consumption of energy and an increased maintenance service to guarantee the necessary safety of operation.

There have been proposed as suitable apparatus in group 3 especially packed columns, pulsating columns and sieve plate columns which also have found general use in industrial hydrogen peroxide plants according to the anthraquinone process. Those sieve plate or packed columns, however, produce in the anthraquinone process certain sources of danger if the extraction is carried out to high hydrogen peroxide concentration in the aqueous extract. Pressure obstructions can occur in such case through the entry of catalysts for the decomposition of hydrogen peroxide and additionally as a result easily detonatable mixtures are formed in the packed column.

From the general literature on extraction it is also known to install spray columns for certain test systems (see Ind. Eng. Chemistry, June 1950, pages 1141 et seq). The use of these columns, however, has always been limited to simple extraction systems such as, for example, ferric chloride-isopropyl ether-hydrochloric acid and to laboratory apparatuses (column diameter 1.5 inch). In these systems the organic phase is the extraction agent.

From summaries of the extraction literature it is evident that spray columns have not found acceptance in industry (see for example the summary of the extraction literature in Fortschritte der Verfahrenstechnik, Vol, 2, page 209, Verlag Chemie, 1956). They were not used even once for simple extraction systems.

Contrary to prevailing opinion, it has now been found that the extraction of hydrogen peroxide can be carried out in unpacked towers with especial effectiveness from working solutions of the alkyl anthraquinone process which are lighter than water and form the dispersed phase in the extraction step. The towers at the bottom are fitted with known means for dispersing organic liquids.

The carrying out of the extraction according to the invention was more surprising since the extraction of hydrogen peroxide from the working solution by itself is an expecially difficult problem because in the system hydrogen peroxide/organic working solution/water the differences in density of both phases are small, as in the distribution coefficient. Additionally, the ratio amount of water present/amount of working solution present is extremely small, in the range of 1:20 to 1:60, frequently 1:50. There can be used as little as 1 part water to 100 parts of working solution.

Furthermore, the system is inclined to form gases whereby a set equilibrium is very easily disturbed. Moreover, the installation of the inserted column according to the invention is the extraction step of the anthraquinone process offers the greatest possible safety in operation in the event of catalysts entering into the column. No pressure obstructions can occur because of the lack of installations and, in the event of gas development, there takes place a quick longitudinal mixing of the column so that detonations are out of the question.

The unpacked towers which are supplied with distributors only at the bottom can be pulsated during the operation. Preferably, however, one works with an unpulsating column. The distributor installed at the bottom of the column serving to disperse the working solution can be porous sintered plates, distribution frits, nozzles, nozzle bundles, etc. Preferably a perforated plate is installed for dispersion of the organic phase (working solution.) In this construction several factors should be considered. First, for the construction of the perforated bottom and the column the characteristics of the working solution should be considered, especially density, viscosity, interfacial tension, distribution coefficient and the content of hydrogen peroxide in the working solution.

Furthermore, there must be considered the hydrogen peroxide required in the extracted crude product, the extraction temperature and the degree of the extraction yield. Thus it is understood that the optimum arrangement of a spray column must always be drawn on a specific system and exact conditions of operation. Consequently in the following description only the general guidelines for the construction of a spray column can be drawn. Those skilled in the art, however, will be able to make the necessary adjustments for individual cases without any difficulty. The attainable industrial and economic advance in a specific system occuring as a result of the use of the named columns according to the invention will be set forth in the specific examples.

For the construction of the perforated plate preferably installed as the distributor, there should be considered first the "free cross section," that is the sum of all perforation cross sections/entire bottom cross section and the perforation diameter whereby several general rules should be observed.

1. If the working solution has a low density a low viscosity and a high interfacial tension, then the perforated plate should have a greater free cross section. This cross section is accomplished by a large number of small holes.

2. If the working solution in contrast to the aqueous phase has a small difference in density and interfacial tension and in addition a high viscosity, then the perforated plate should have a small free cross section which is provided by relatively few larger holes.

Between the named boundaries there are numerous overlapping and transition conditions which appear from the variety of the physical data of the previously proposed working solutions. The laying out of the perforated bottom distributor in the spray column used in the invention can vary therefore within the relatively wide boundaries of 1.5 to 8.0 percent for the free cross section in the distributor bottom and 0.5 to 5.0 mm. for the diameter of the holes in the distributor bottom. The preferred range for the free cross section is between 3.0 and 5.0 percent and for the diameter of the holes between 1.5 and 3.5 mm. Underneath the distributor (preferably the perforated plate) there should be a cohesive organic phase (working solution) which should have a depth less than 50 cm, especially between 3 and 30 cm. In order that the aqueous phase can be discharged during the countercurrent extraction, downcomers should be installed preferably in the perforated plate, if the spray column is nonpulsating.

The proportioning of the column diameter first of all depends on the dimensioning of the perforated plate. The free cross section of the perforated plate determines the maximum permissible space velocity (cubic meters organic phase/ square meters column cross section per hour). For the calculation of the "effective height" of the column the following factors are determined.

1. The capacity of the working solution, i.e., the $H_2O_2$ concentration present in the organic phase (grams $H_2O_2$ per liter of working solution).
2. The desired $H_2O_2$ concentration in the crude product of the extraction.
3. The desired degree of extraction yield.
4. The distribution coefficient:

$$DC = \frac{H_2O_2 \text{ concentration in the aqueous phase}}{H_2O_2 \text{ concentration in the working solution}}$$

On the basis of this data and the distribution curve there can be determined the necessary number of theoretical stages in a column. After calculation of the necessary "effective" height of a column, it is then clear whether the extraction can be carried out in a single column or whether there must be used a system of several columns.

It was already mentioned, that spray columns have always been considered unsuitable for industrial extraction processes. Surprisingly enough the spray column according to the invention shows very small HETS VALUES (height equivalent to a theoretical stage). Since spray columns in the invention have no installations, they permit large throughputs so that completely contrary to other types of extraction columns the following advantages result:

a. The spray columns of the invention have a small height and a small diameter as a result of which there is a smaller apparatus expenditure and consequently yields an economic advantage.

b. The spray columns are of simple construction in contrast to the customary columns in the extraction due to the omission of additional installations. A scale up can be undertaken without risk.

c. With the customary working solutions in the anthraquinone process which have a capacity of 5–15 grams of $H_2O_2$ dissolved per liter of working solution, most of the extraction can be carried out in a single column if hydrogen peroxide concentration of 15 – 60 weight percent are to be attained in the crude product of extraction.

d. By the omission of additional installations operational disturbances, for example on account of breakthroughs of small particles of catalyst from the hydrogenation step, are quickly eliminated, that is they do not lead to long operational interruptions and losses in yield.

e. The liquid holdup is less than in other types of columns. This means a savings of expensive working solution.

f. The residence time of the phases in the extraction step is reduced, that is, the possibility of the formation of degradation products by adverse influences on the phases is remarkably reduced.

With the new type of spray columns there can be extracted all of the working solutions suggested for the anthraquinone process which are lighter than water and represent the dispersed phase in the extraction step. Of these, the preferred working solutions include as solvents aromatic hydrocarbons and organic esters of phosphoric and phospho-nic acid. Among the aromatic hydrocarbons, for example, there are preferred mono or poly alkylated benzene hydrocarbons in the boiling range (normal pressure) of 140°–220°C. These include, for example, t-butyl benzene, ethyl methyl benzene, t-butyl toluene, 1,2,3-trimethyl benzene, 1,2,4-trimethyl benzene, ethyl propyl benzene, 1,3-diethyl benzene, 1,4-diethyl benzene, 1,2,3,4 tetramethyl benzene, mesitylene, isodurene, etc. There can be employed, of course, mixtures of such hydrocarbons. There can also be used methyl naphthalene, dimethyl naphthalene, toluene, m-xylene, p-xylene, o-xylene.

As phosphates and phosphonates, these are preferably used esters having 12 to 27 carbon atoms in hydrocarbyl groups. Preferably the hydrocarbyl groups are alkyl, most preferably of five to nine carbon atoms. Examples of suitable phosphates and phosphonates include trioctyl phosphate, tri n-amyl phosphate, tri 2-ethylhexyl phosphate, tributyl phosphate, triisobutyl phosphate, butyl diisoamyl phosphate, triisoamyl phosphate, trinonyl phosphate, dibutyl butane phosphonate, dibutyl pentane phosphonate, diethyl hexane phosphonate, dibutyl hexane phosphonate, diethyl heptane phosphonate, diethyl heptane phosphonate, dibutyl heptane phosphonate, dibutyl octane phosphonate, dimethyl octane phosphonate, dibutyl decane phosphonate, dioctyl octane phosphonate.

As alkyl anthraquinones there are used, for example, 2-ethyl anthraquinone, 2-butyl anthraquinone, 2-isopropyl anthraquinone, 2-amyl anthraquinone, 2-sec. butyl anthraquinone, 2-t-butyl anthraquinone, and mixtures thereof as well as their partially nuclear hydrogenated derivatives, e.g., the tetrahydro-anthraquinones such as 2-ethyl tetrahydro-anthraquinone and 2-t-butyl tetrahydro-anthraquinone.

Preferably the extraction is carried out in a single step wherein the column should have an "effective" height of 10 to 35 meters, especially between 15 and 25 meters. It is also possible, however, to carry out the extraction in two steps.

The temperature in the extraction can be held within wide boundaries. Preferably the extraction temperature is between 30° and 65°C.

Unless otherwise indicated, all parts and percentages are by weight.

The invention will be further illustrated by the following examples.

EXAMPLE 1

In an industrial apparatus for the production of hydrogen peroxide according to the anthraquinone process, there was recycled a working solution through the process steps of hydrogenation, filtration, oxidation, extraction and purification. The working solution contained as the solvent a mixture of 75 volume percent aromatic hydrocarbon (boiling range at normal pressure 185°–208°C) and 25 volume percent trioctyl phosphate. In the solvent there were dissolved as reaction carrier:

27 grams of 2-ethylanthraquinone per liter
91 grams of 2-ethyl tetrahydroanthraquinone per liter.

The working solution was hydrogenated in the presence of a palladium catalyst so that after the oxidation step as well as in the solution introduced to the extraction there was present a $H_2O_2$ amount of 1 weight percent. The extraction step was carried out in 2 stages and consisted of a 9 meter long experimental column and a 9 meter long packed pulsating column with 9 inches in diameter. The flow of the working solution could be adjusted in the range of 100–800 liters per hour according to the capacity of the experimental extraction column. Correspondingly the necessary water for the extraction was fed in countercurrent flow with the aqueous phase discharging below the perforated bottom into the column system in the ratio (working solution:water) of 100:1 (for example, 450 liters of working solution to 4.5 liters of water). Thereby in the extraction there was constantly recovered an about 50 percent solution of $H_2O_2$. The temperature was always 42°C. in both extraction columns.

EXAMPLE 2

As the experimental column using the working solution of example 1 and the same solution to water ratio there were employed at different times three different 9 meter long column:

a. packed column (diameter 4 inches) Filling 15 × 15 mm. ceramic berl saddles b. Sieve plate column (diameter 4 inches) Distance between the sieve plates: 1 meter Free cross section in the sieve plate: 2.0 percent Hole diameter 3.2 mm.

c. Spray column (diameter 4 inches) Free cross section in the distributor plate: 4 percent Hole diameter 0.8 mm.

In the tests which lasted for two weeks, there was measured the capacity and the effectiveness of the named columns (a), (b) and (c). The results in each case of 10 column testings are set forth in the following table.

| Column Type | Maximum Column Flow of Worksolution l/h | Capacity Space Velocity $m^3/m^2 \cdot h$ | Height Equivalent to a Theoretical Stage (HETS), Meters |
|---|---|---|---|
| a | 173 | 22 | 4.2 |
| b | 252 | 32 | 4.7 |
| c | 650 | 83 | 2.2 |

In each case an about 50 percent aqueous solution of $H_2O_2$ was recovered.

The results speak for themselves and show that the spray column of the invention could carry about 3 times the load as the previously employed packed columns and sieve plate columns in the anthraquinone process and needed to be only half as high to obtain the same degree of efficiency. From this the further conclusion can be drawn that spray columns in total need only 15–20 percent of the volume that is required for packed columns and sieve plate columns. A corresponding statement is valid for the residence time of the phases in the extraction step.

The spray columns of the invention allow a space velocity up to 85 cubic meters of working solution per square meter cross section of the column per hour. Above 32 cubic meters/sq. m. per hour is, of course, a substantial improvement over the currently available procedures.

What is claimed is:

1. In a process for the extraction of hydrogen peroxide from an organic solvent containing working solution in the alkyl anthraquinone process which solutions are lighter than water and which form the dispersed phase in the extraction step the improvement comprising passing the working solution and water in countercurrent flow through an unpacked spray column fitted at the bottom with distributors for dispersing the organic liquid whereby the hydrogen peroxide is extracted from the organic liquid to the water.

2. A process according to claim 1 comprising passing the working solution through a perforated plate at the bottom of the column and thereby dispersing said working solution.

3. A process according to claim 2 comprising passing the working solution through said perforated plate having a free cross section of 1.5–8 percent.

4. A process according to claim 3 wherein the free cross section is 3.0–5 percent.

5. A process according to claim 3 comprising passing the working solution through holes in the perforated plate, said holes having a diameter of 0.5–5.0 mm.

6. A process according to claim 5 wherein the holes have a diameter of 1.0–3.5 mm.

7. A process according to claim 1 wherein the solvent of the working solution includes a member of the group consisting of aromatic hydrocarbons, organic phosphate esters and organic phosphonate esters.

8. A process according to claim 1 wherein the solvent is a mixture of an aromatic hydrocarbon and a trialkyl phosphate.

9. A process according to claim 8 wherein the working solution contains 27 grams of 2-ethyl anthraquinone and 91 grams of 2-ethyltetrahydroanthraquinone per liter of solution, the solvent is a mixture of 75 volume percent aromatic hydrocarbon having a boiling range of 185°–208°C. and 25 volume percent trioctyl phosphate, the ratio of working solution to water is 100:1, the extraction is carried out at 42°C. and there is obtained an aqueous extract containing 50 percent $H_2O_2$ at a rate of 83 cubic meters/sq.m.cross section of column per hour.

10. A process according to claim 1 wherein there is employed a water to a working solution ratio of from 1:20 to 1:100 and obtaining a concentration of hydrogen peroxide in water of 50 to 60 percent.

11. A process according to claim 10 wherein the hydrogen peroxide concentration in water is 50 percent.

* * * * *